Patented Apr. 15, 1930

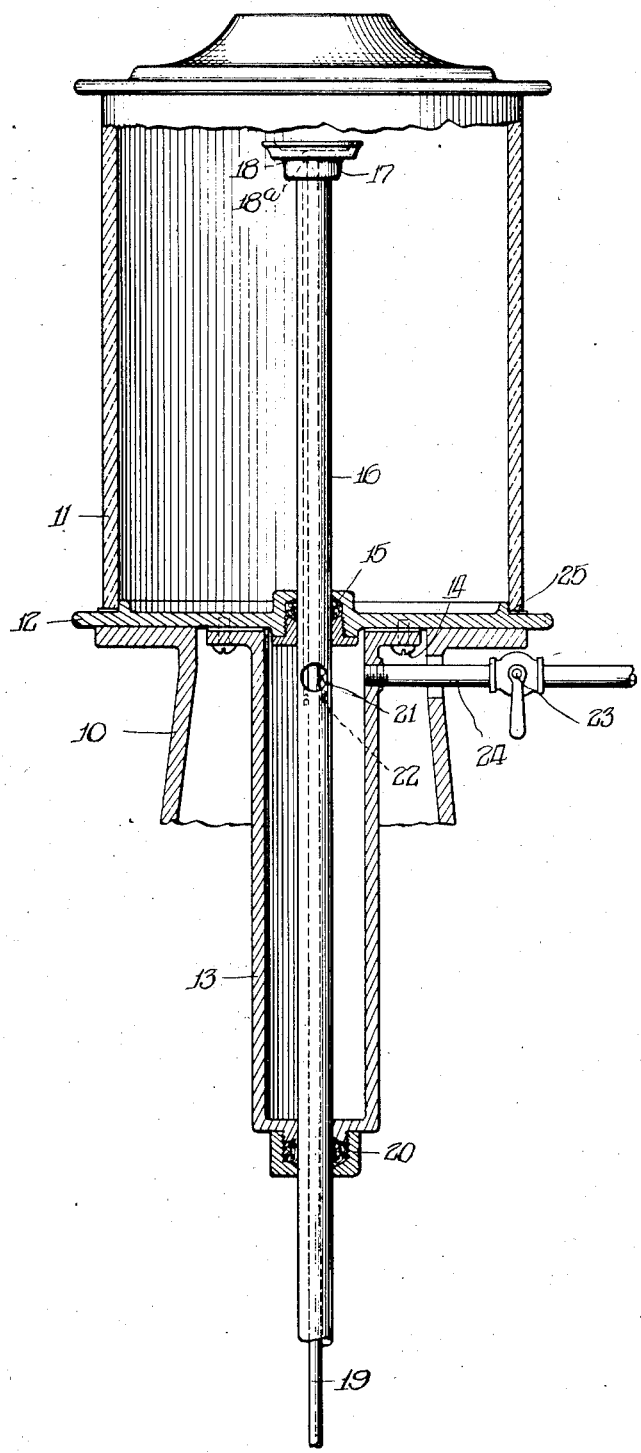

1,754,615

UNITED STATES PATENT OFFICE

LEO DEUTSCH, OF BEAVER, PENNSYLVANIA, ASSIGNOR, BY MESNE ASSIGNMENTS, TO THE WAYNE PUMP COMPANY, OF BALTIMORE, MARYLAND, A CORPORATION OF MARYLAND

VISIBLE PUMP

Application filed July 18, 1927. Serial No. 206,575.

This invention pertains to a fluid dispensing apparatus, and more particularly to a device adapted to selectively measure and deliver fluid from a fluid pump.

It is an object of this invention to provide a measuring device for determining amounts of fluid to be dispensed and providing said device with means whereby the fluid may be selectively delivered.

Another object is to provide an inexpensive, positive and desirable measuring and delivering device for dispensing fluid whereby said fluid is dispensed through an independent receptacle from that in which said fluid is measured.

Still another object is to provide means whereby delivery of a full amount of fluid is assured.

A further object is to provide a readily operable fluid measuring and control means for delivering fluid selectively to a receptacle separate from the measuring chamber before ultimate delivery from the device.

A still further object is to provide a dispensing apparatus of such character that the fluid is delivered from a measuring chamber to its point of delivery by gravity and by a pressure head, the delivery and measuring means being of such character that a selected amount of fluid is delivered and controlled by said measuring means.

Other, further and more specific objects will readily occur from the detailed description, specification and drawing appended hereto.

In the drawing, the figure is a fragmentary sectional elevation through the measuring chamber of a dispensing apparatus and the adjacent dispensing means.

The dispensing apparatus illustrated is of the pump type and includes the ordinary support casing or standard 10 provided with the measuring chamber 11 which may be of the visible or blind type, said measuring chamber being provided with the usual top or cap and suitably seated on support 12 forming the bottom of said measuring chamber. A delivery pot 13 is suitably secured as by screws 14 to the support 12, which support is provided with a suitable stuffing box 15 at the top of the pot, through which a measuring pipe or tube 16 is adapted to have sliding and rotating adjustment. Fitting 17 is preferably provided at the top of the measuring tube and is suitably shaped so that there will be no tendency of the fluid to sink to an improper level, as in the case of capillary attraction, causing a gradual leakage over the lip of the measuring tube. This fitting is provided with a valve seat 18ª cooperating with the valve disc 18 for the purpose of controlling the flow through the measuring pipe, the valve disc being controlled by a valve stem 19 actuated by suitable operating means. The overflow pipe may be controlled by any convenient means, such as the usual handle and measuring fingers (not shown) so that this measuring tube is set in proper position, measuring from the top down in the measuring chamber by a combined motion of rotation and translation, it being understood that the valve mechanism is not affected by the setting of the overflow tube and may be separately operated in order to control the flow of the fluid through the measuring tube after said tube has been set to deliver a predetermined amount of fluid.

A port 21 is provided in the overflow tube, said port being always located in the pot 13, having a travel from a point adjacent the draw-off connections 24—23 to a point adjacent the bottom of said pot 13, which bottom is provided with stuffing box 20 to prevent leakage from the pot. A suitable stuffing box 22 is also provided in the measuring tube so that there will be communication only to the pot 13 from the measuring chamber; that is, there will be communication past the valve 18 only to the port 21. Adjacent the top of the pot there is provided a draw-off valve 23 connected to the pot by a pipe 24, said valve controlling the flow of fluid to the usual hose connections.

It will be understood that a suitable scale is provided on the measuring chamber, which scale corresponds to the measuring fingers provided and also corresponds to the position of the draw-off pipe 24 and the port 21, and the travel of said port in the pot 13.

It will be understood that the pot 13 is at all times filled wih fluid and when it is desired to dispense any amount of fluid, the measuring chamber 11 is filled, the handle provided on the overflow tube 16 is partially rotated and lowered from the zero position to a position corresponding to the amount desired to be dispensed, and the handle is then rotated into the finger corresponding to this amount. The valve 18 is then opened by suitable mechanism operating the valve stem 19, and the valve 23 is opened providing access from the pot to the draw-off hose. It will readily be appreciated that it is quite possible to so control the valve 23 and the valve 18 so that neither may be operated until the handle for operating the measuring tube is placed in a predetermined position. There will be a pressure head then due to the fluid disposed above the draw-off connection 24, which as well as the force of gravity will cause the fluid to flow down the measuring tube, through the port 21 displacing the fluid in the pot 13 at the draw-off connection 24, through the valve 23 to the delivery hose. It will be noticed that the fitting 17 may be disposed above the support 12 in its lowermost position so it will be readily understood that any sediment in the fluid will settle on the support 12 where suitable cleaning and draw-off communications may be provided. Also, due to the fact that the pot 13 is provided, should any sediment flow through the pipe 16 it will tend to settle in the pot where it can be suitably drained.

I do not wish to be limited to the exact embodiment of the device shown as other and various embodiments will of course be apparent to those skilled in the art.

I claim:

1. In a device of the character described, the combination of a measuring chamber, a fluid reservoir associated therewith, and means communicating with said reservoir for controlling flow of fluid from said chamber to said reservoir, said means including measuring means and valve means for controlling the flow of fluid into said first named means and reservoir and a draw-off means from said reservoir, said valve means being operable externally of said chamber and said reservoir.

2. In a device of the character described, the combination of a measuring chamber, a fluid reservoir associated therewith and rotatable slidable adjustable means communicating with said reservoir for determining the amount of fluid discharged to said reservoir, said means including measuring and delivering means and valve means for controlling the fluid flow into said measuring and delivering means, and draw-off means from said reservoir, said valve means being operable by means extending through said delivering means, and operable externally of said chamber and said reservoir.

Signed at Rochester, Pennsylvania, this 13th day of July, 1927.

LEO DEUTSCH.